Dec. 23, 1969    J. R. MEYER    3,485,401
VEHICLE LOADING METHOD AND APPARATUS
Filed March 8, 1968    2 Sheets-Sheet 1

INVENTOR.
Jerry R. Meyer
BY Jones & Thomas
ATTORNEYS

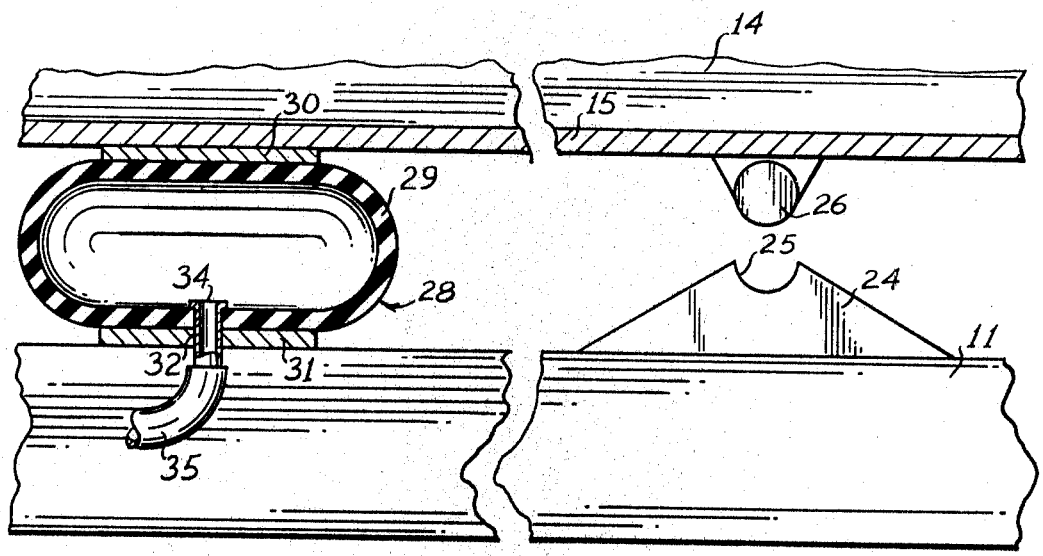
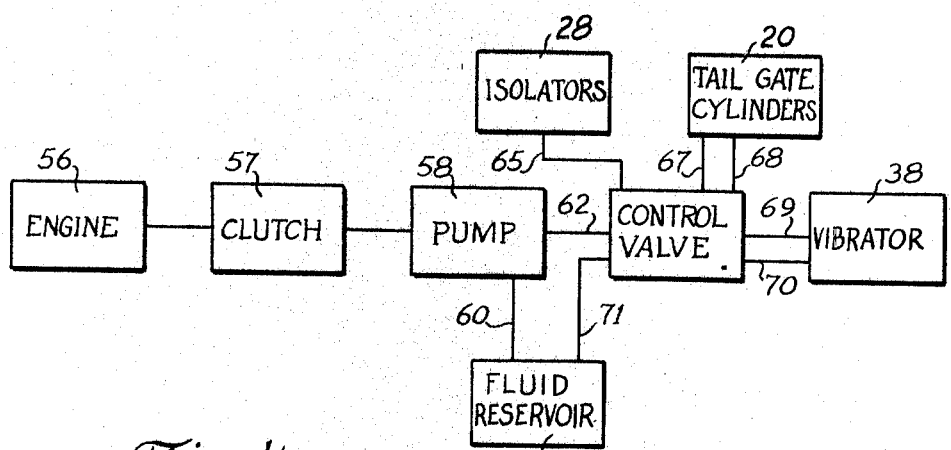

United States Patent Office 3,485,401
Patented Dec. 23, 1969

3,485,401
VEHICLE LOADING METHOD AND APPARATUS
Jerry R. Meyer, 1821 Morris Landers Drive NE.,
Atlanta, Ga. 30329
Filed Mar. 8, 1968, Ser. No. 711,662
Int. Cl. B60p *1/58;* B65g *27/22*
U.S. Cl. 214—512                                10 Claims

ABSTRACT OF THE DISCLOSURE

A vehicle loading method and apparatus including a mobile frame, and a platform normally rigidly connected to the frame. Expandable fluid elevating pads are placed between the frame and the platform and are extendable to suspend the platform above the frame. A vibrator is connected to the platform in such a manner that linear oscillations can be imparted to the platform. The vibrator is rotatable about an upwardly extending axis, and pivotal about a horizontal axis, so that the direction of linear oscillations of the vibrator which are transmitted to the platform can be varied.

BACKGROUND OF THE INVENTION

In the loading and unloading of trucks, particularly large trucks having an enclosed storage area, it is inconvenient and time consuming for the men loading the truck to board the truck and carry items to and from the interior storage area of the truck. During the usual loading and unloading operations, it is convenient to have two men stationed in the storage area of the truck to carry articles to and from the tailgate and two men stationed on the ground to deliver articles to and retrieve articles from the truck. If fewer men are available, the situation usually requires that at least one of the men frequently board the truck to assist in handling the goods on the truck.

While various devices have been developed which assist workmen in loading and unloading trucks, the goods which trucks are expected to transport vary widely in size, shape, weight and other qualities, so that a single loading device has not yet been developed which is capable of handling virtually all the goods and materials transportable in the trucking industry. For instance, the large heavy goods may require a fork lift truck or pallet, while gravel or loose fruit and logs may require a dump truck.

SUMMARY OF THE INVENTION

Briefly described, the invention comprises a vehicle loading and unloading method and apparatus which includes a portable support frame, and a platform or body. A vibrator is connected to the platform and is operable to impart linear vibrations to the platform. A plurality of fluid actuated isolators are positioned between the frame and the platform, and are effective to prevent a major portion of the vibrations from being transmitted to the frame. The vibrator is rotatable and pivotable with respect to the platform so that the vibrations can be aimed or directed in virtually any direction.

Thus, it is the object of this invention to provide a vehicle loading and unloading method and apparatus which is effective to load or unload virtually any object or material from the vehicle.

Another object of this invention is to provide a vehicle loading apparatus which is operable from various positions about the vehicle and requires no external or extra equipment in its operation other than the equipment attached to the vehicle itself.

Another object of this invention is to provide a vehicle loading method and apparatus which enables a single operator to unload a vehicle without boarding the storage area of the vehicle.

Another object of this invention is to provide a vehicle loading apparatus which is inexpensive to construct and operate, which is convenient to use, and which is adapted to load or unload virtually any object that can be carried on a flat platform.

Other objects, features and advantages of the present invention will become apparent upon reading the following specifications, when taken in conjunction with the accompanying drawings.

BRIEF DESCRIPTION OF THE DRAWINGS

FIG. 3 is a partial showing of the frame and platform and a platform cradle and a frame isolator.

FIG. 4 is a schematic showing of the control system of the unloading apparatus.

DESCRIPTION OF THE PREFERRED EMBODIMENT

Figure 1:
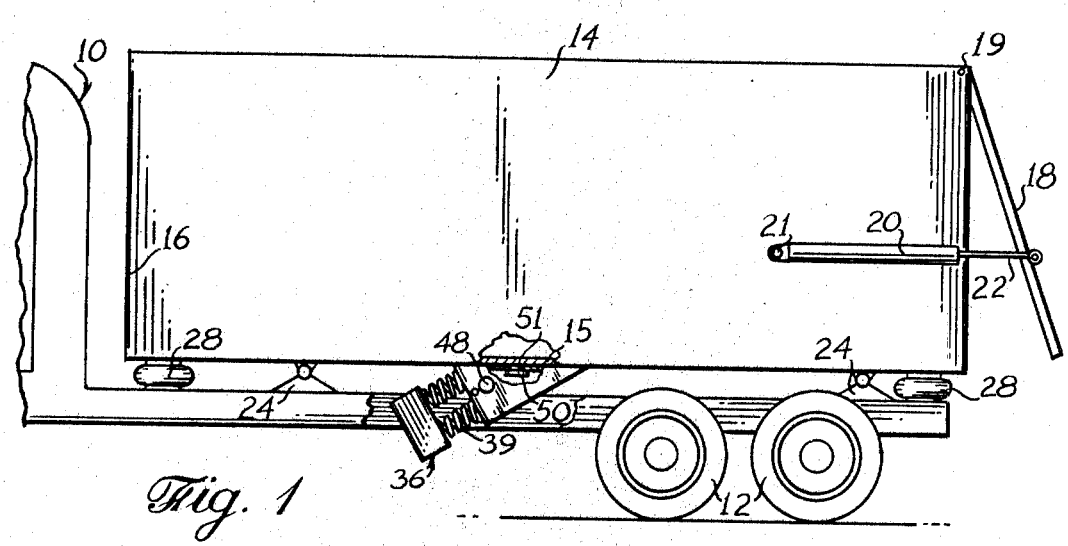
FIG. 1 is a partial schematic side view of a vehicle and its loading and unloading apparatus.

Referring now more particularly to the drawing, in which like numerals indicate like parts throughout the several views, FIGURE 1 shows a vehicle or truck 10, which includes a support frame 11 mounted in the conventional manner on wheels 12. Truck body 14 is supported by frame 11, and includes floor or platform 15 and sidewalls 16 extending upwardly from floor 15. Door or tailgate 18 is connected to body 14 horizontal hinge 19 at the upper rear end of body 14 in such a manner that door 18 swings out and up from the body to open the rear of the body. Hydraulic cylinders 20 are pivotally connected at one of their ends by pivot pins 21 to opposite walls of body 14, and rams 22 extend from the opposite ends of cylinders 20 and are connected to door 18. Thus, cylinders 20 are effective to control the movement of door 18.

Frame 11 includes a plurality of cradles 24 (FIGS. 1 and 3) along the upper surface of frame 11. Cradles 24 each include an upwardly faced crescent-shaped slot 25. A plurality of support pins 26 are connected to the bottom surface of platform 15 of body 14 at intervals spaced according to the spacing of cradles 24. Pins 26 are of a diameter complementary to the diameter of crescent-shaped slots 25 of cradles 24, so that cradles 24 will normally receive pins 26 and rigidly support body 14 from frame 11, as shown in FIGURE 1.

As is shown in FIGURES 1 and 3, a plurality of vibration isolators 28 are positioned along the upper surface of frame 11, between frame 11 and platform 15 of body 14. Each isolator 28 includes a flexible closed body 29 fabricated from rubber or a similar flexible compound, and upper and lower anchoring plates 30 and 31, respectively. Lower anchoring plate 31 and the lower portion of flexible housing 29 define aligned apertures which receive conduit 32 therethrough. Conduit 32 includes flange 34 connected thereto internally of flexible housing 29, and connecting conduit 35 connected thereto externally of housing 29, below anchoring plate 31.

With the arrangement of vibration isolators 28 and cradles 24 and their respective support pins 26, it can be seen that when pressurized fluid enters isolators 28, body 14 will be lifted away from frame 11. When the fluid is drained from isolators 28, body 14 will be lowered and supporting pins 26 will rest in the crescent-shaped slots 25 of cradles 24. Thus, when body 14 is lifted by means of isolators 28, body 14 will be free to move, to a limited extent, with respect to frame 11. When the bed rests in cradles 24, the bed will be rigidly supported by frame 11.

Figure 2:
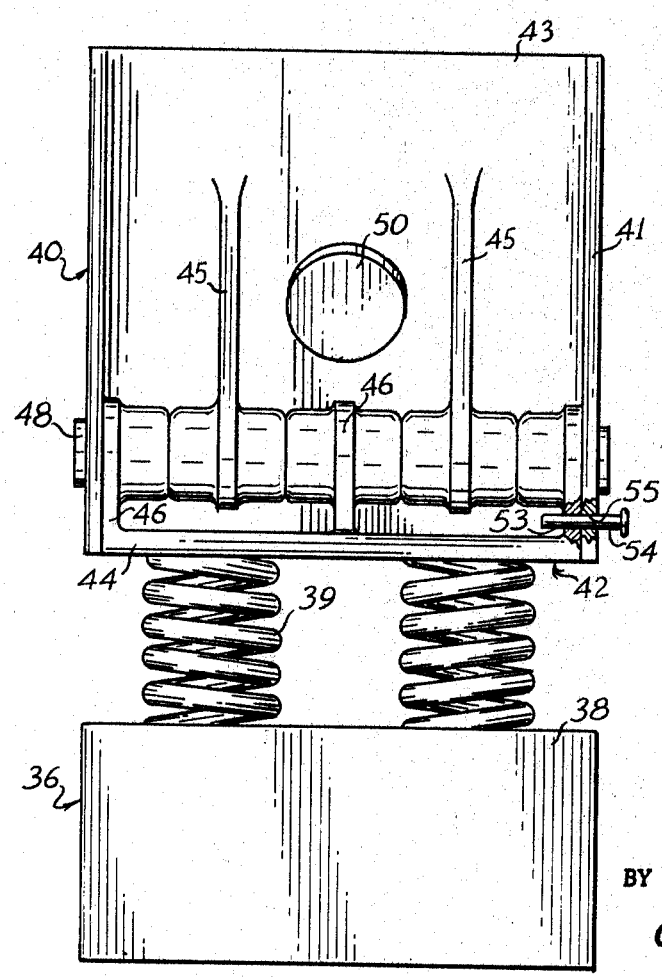
FIG. 2 is a perspective view of a vibrator and the manner in which it is connected to the platform of the vehicle.

As is best shown in FIGURES 1 and 2, vibrating assembly 36 is connected to the bottom surface of platform 15 of body 14. Vibrating assembly 36 includes vibrator 38, springs 39, and universal joint 40. Vibrator 38 may be of any of the conventional type vibrators, and may be energized by electricity, compressed air, or hydraulic pressure. For the purposes of description of this invention, vibrator 38 will be described as an hydraulic vibrator. Universal joint 40 comprises rotatable support 41 and pivotal support 42. Rotatable support 41 includes horizontal support plate 43 and downwardly extending lugs 45. Pivotal support 42 is similar to rotatable support 41 and includes support plate 44 and upwardly extending lugs 46. Lugs 45 and 46 define aligned apertures therethrough, and connecting rod 48 is inserted through the aligned apertures. Rotatable support 41 is connected to platform 14 of body 14 by means of axle 50 extending downwardly from platform 15 through aperture 41 of support plate 43. Thus, vibrating assembly 36 is rotatable about platform axle 50, and pivotal about connecting rod 48. Since vibrator 38 is connected to universal joint 40 by means of coil springs 39, the motion of vibrator 38 about the longitudinal axes of springs 39 generally will be absorbed by the spring action and not transmitted to universal joint 40; however, the motion of vibrator 38 along the longitudinal axes of springs 39 will be imparted to universal joint 40 and to platform 15. Thus, the vibrations received by platform 15 from vibrator 38 will be primarily only linear vibrations.

Since vibrating assembly 36 is both rotatable and pivotal with respect to platform 15, the direction of the linear vibrations imparted to platform 15 can be selected and controlled. Since axle 50 of platform 15 is positioned with respect to vibrating assembly 36 so that the vibrations will be directed primarily through the center of axle 50, and once vibrating assembly 36 has been rotated about axle 50 to the desired position, the vibrations of vibrator 38 will normally not be such as to cause the assembly to rotate about axle 50; however, the vibrations and weight of vibrator 38 will normally cause vibrator 38 to hang in a downward direction from connecting rod 48. Therefore, retaining pin 54 is insertable through any one of a plurality of apertures 55 of an end lug 45 of rotatable support 41 and apertures 53 of an end lug 46 of pivotal support 42. Thus, when the desired directional pitch of the vibrations imparted to platform 14 has been selected, retaining pin 54 can be inserted through the aligned apertures of lugs 45 and 46, to hold vibrator 38 in its selected position.

As is shown in FIGURE 4, the engine 56 of the vehicle is connected to pump 58 through clutch 57 to supply motive power to the hydraulic system. Pump 58 receives the fluid necessary for the system through fluid reservoir 59, through conduit 60, and urges the fluid toward control valve 61 through conduit 62. Control valve 61 is manipulated by the operator, and controls the flow of fluid to and from vibration isolators 28, through conduits 65, to and from tailgate cylinders 20, through conduit 67 and 68, and to and from vibrator 38, through conduit 69 and 70. The fluid flowing back through control valve 61 flows to fluid reservoir 59 through conduit 71.

OPERATION

When it is desired to unload objects from vehicle 10, the operator allows engine 56 to idle and engages clutch 57 to energize pump 58. The operator then manipulates control valve 61 to flow fluid toward isolators 28, which raises body 14 from frame 11. After body 14 has been raised a distance sufficient to lift support pins 26 from cradles 24, the flow of fluid to isolators 28 is terminated, and fluid is directed to tailgate cylinders 20, to open door 18 of vehicle 10. With body 14 in this condition, control valve 61 is manipulated to flow fluid to and from vibrator 38, whereupon linear vibrations are imparted to platform 15 of body 14. If the goods are to be moved from the door 18 inwardly of the storage area of body 14, vibrating assembly 36 is rotated about its axle 50 until connecting rod 48 of universal joint 40 extends generally laterally of the longitudinal axis of the vehicle, and vibrator 38 is pivoted about connecting rod 48 until the longitudinal axis of its spring 39 is directed generally toward the interior end of body 14. Retaining pin 54 is inserted through mated ones of the apertures of lugs 45 and 46 of universal joint 40, so that vibrator 38 is maintained at the desired pitch. With this arrangemnt, the vibrations imparted to the platform 15 will urge the goods toward the interior portion of the vehicle. By merely rotating vibrating assembly 36 about its axle 50, the direction of movement of the goods within bed 14 can be changed. For instance, vibrating assembly 36 can be pivoted to the position as shown in FIGURE 1 to move the goods within vehicle 10 toward door 18.

It is anticipated that vibrator 38 will normally be utilized so that its linear oscillations will be directed to an angle between 10 and 80° with respect to the surface of platform 15. When very light goods are being loaded on platform 15, the linear oscillations can be directed closer to an angle of 10° which results in maximum linear movement with only a small amount of vertical movement of the goods on platform 15. Conversely, when the goods are heavy, it may be necessary to angle vibrator 36 so that the linear oscillations imparted to platform 15 are closer to the vertical, so that the vibrations are more effective in moving the heavier goods.

After the goods have been loaded as desired, the operator cam manipulate the control valve to terminate the vibrations, close the door 18, and allow isolators 28 to collapse, which sets body 14 back in its cradles 24. Of course, various locking devices (not shown) can be utilized to insure that body 14 will be positively held in cradles 24.

While vibrator 38, isolators 28, and tailgate cylinders 20 have been disclosed as being hydraulically actuated, it will be understood that these elements can be actuated by pneumatic means, or electrically. Furthermore, while isolators 28 have been disclosed as expandable and collapsable members, other type isolators can be utilized. For instance, coil or leaf springs can be positioned between frame 11 and bed 14. Vibrator 36 can be a motor type, piston type, or electromagnetic type vibrator.

Control valve 61 can be located adjacent door 18 of vehicle 10, or can be positioned inside the cab of the vehicle. Also, control valve 61 can be duplicated; i.e., several control valves can be positioned at various points about the vehicle so that the unloading function can be operated at different positions about the vehicle. With this arrangement, the operator can control the loading and unloading from inside the cab, or at the door 18, for instance. While it is anticipated that the position of vibrator 38 with respect to platform 15 will be controlled by hand by the operator reaching beneath bed 14 to turn or pivot vibrator 38, it should be understood that it is not beyond the scope of this invention to employ various remote control means to position vibrator 38 with respect to platform 15.

While vibrating assembly 36 and its associated components have been disclosed as being connected to platform 15, it should be understood that vibrating assembly 36 can be connected only to a sectional portion of platform 15, so that a runway or strip of platform 15 can be vibrated while the remaining portion of platform 15 remains substantially stationary.

The rate at which the goods can be discharged from the vehicle can be controlled by changing the angle or pitch of the vibrations from vibrator 36, by speeding up the engine of the vehicle to drive the vibrator at a faster rate, or when unloading a mass of goods such as oranges or gravel, by controlling the opening of door 18.

What is claimed as my invention is:

1. In a vehicle of the type for transporting material on a substantially horizontal platform, the combination therewith of vibrating means connected to said platform, said vibrating means being constructed and arranged to impart linear oscillation to said platform at an angle greater than 10 degrees with respect to the surface of said platform, whereby material present on said platform will be moved with respect to said platform, said platform including walls extending upwardly thereabout and a door member pivotal about a substantially horizontal axis above an edge of said platform and movable into and out of closed relationship with said platform, power means for moving said door, and a single source of power for driving said vibrating means and said power means.

2. In a vehicle of the type for transporting materials, the combination of a support means, a generally horizontally extending platform supported by said support means, vibration means for imparting substantially linear vibrations to said platform, and connecting means for selectively rigidly connecting together said support means and said platform or for supporting said platform from said support means in such a manner that at least a major portion of the vibrations of said platform are not transmitted to said support means.

3. The invention of claim 2 wherein said connecting means comprises at least one fluid filled member positioned between said support means and said platform and is expandable to movably support said platform from said support means, and cradle means for rigidly connecting together said platform and said support means.

4. The invention of claim 2 wherein said vibration means are rotatably connected to said platform about an upwardly extending axis in such a manner that the linear vibrations can be directed at various angles about said platform, and wherein said vibration means are pivotally connected to said platform about a laterally extending axis in such a manner that the linear vibrations can be directed at various angles with respect to the surface of said platform.

5. A load carrying vehicle including a frame and a load carrying platform member, vibrator means connected to said load carrying member for loading and unloading said load carrying member, first support means for rigidly connecting together said frame and said load carrying member, and second support means for movably connecting together said frame and said load carrying member whereby said load carrying member is rigidly connectable to said frame by said first support means as the vehicle is moved from one location to another location and said load carrying member is movably connectable to said frame by said second support member when said vibrator means is energized to vibrate said load carrying member to load and unload articles carried by said load carrying member.

6. The invention of claim 5 wherein said second support means comprises fluid inflatable support means positioned between said frame and said load carrying member and expandable to lift said load carrying means in an upward direction with respect to said frame.

7. The invention of claim 5 wherein said vibrator means is constructed and arranged to impart primarily only linear vibrations to said load carrying member, and said vibrator means is pivotally and rotatably connected to said load carrying member whereby the directions of the vibrations imparted to said load carrying member are variable.

8. The invention of claim 7 wherein said vibrator means is rotatably connected to the bottom surface of said load carrying member about a substantially vertical axis and is pivotally connected to the bottom surface of said load carrying member about a substantially horizontal axis.

9. The invention of claim 5 wherein said first support means comprises a plurality of cradle means positioned between said frame and said load carrying member with each of said cradle means including a first cradle element connected to said frame and a second cradle element connected to said load carrying member, with the first and second cradle elements of each cradle means being movable with respect to each other in one direction into engagement with each other for rigidly connecting together said frame and said load carrying member and in the opposite direction for disengagement from each other for permitting the load carrying member to move with respect to the frame.

10. A load carrying vehicle for transporting materials comprising a frame, a normally horizontally disposed load carrying platform normally rigidly resting on said frame, means for lifting and movably supporting said platform with respect to said frame, adjustable vibrating means pivotally and rotatably connected to said platform for loading and unloading said platform, said vibrating means being constructed and arranged to impart linear oscillations to said platform at an angle with respect to the surface of said platform whereby materials present on said platform will be moved with respect to said platform.

References Cited

UNITED STATES PATENTS

| | | | |
|---|---|---|---|
| 2,500,293 | 3/1950 | O'Connor | 214—83.3 XR |
| 2,656,037 | 10/1953 | Bergmann | 198—220 |
| 3,175,717 | 3/1965 | Smith | 214—84 XR |
| 3,253,701 | 5/1966 | Evans | 198—220 |
| 3,348,664 | 10/1967 | Renner | 198—220 |

FOREIGN PATENTS

| | | |
|---|---|---|
| 804,087 | 5/1951 | Germany. |
| 862,120 | 1/1953 | Germany. |
| 901,039 | 1/1954 | Germany. |
| 874,833 | 4/1953 | Germany. |

ALBERT J. MAKAY, Primary Examiner

U.S. Cl. X.R.

198—220; 214—83.3; 222—199